Patented July 13, 1954

2,683,735

UNITED STATES PATENT OFFICE 2,683,735

AROMATIC ESTERS OF BASICALLY SUBSTITUTED ISOCYCLYL CARBAMATES

John W. Cusic, Skokie, Ill., assignor to G. D. Searle & Co., Chicago, Ill., a corporation of Illinois No Drawing. Application December 8, 1951, Serial No. 260,781

5 Claims. (Cl. 260—468)

The present invention is concerned with a new group of esters of substituted carbamic acids and, especially, with the basically substituted isocyclyl carbamates of the structural formula

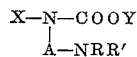

and salts thereof, wherein X is a lower isocyclyl hydrocarbon radical, Y is a lower aromatic hydrocarbon radical, A is a lower, saturated, bivalent, aliphatic hydrocarbon radical containing at least 2 carbon atoms, and NRR' is either a dialkylamino radical or a nitrogen-containing saturated, heteromonocyclic radical attached to the radical A through a nitrogen in the heterocycle.

In the foregoing structural formula the radical X is an isocyclic hydrocarbon radical in which one of the cyclic carbon atoms is attached to the nitrogen atom of the carbamide group. X can be saturated or unsaturated; thus it can be a lower cycloalkyl radical such as cyclopropyl, cyclobutyl, cyclopentyl and cyclohexyl or a lower alkyl substitution product thereof such as methylcyclopentyl or ethylcyclohexyl. X can also be a lower aryl hydrocarbon radical containing 6 to 15 carbon atoms such as phenyl, tolyl, xylyl, naphthyl, methylnaphthyl, fluorenyl, phenanthryl and anthracyl.

The radical Y is an aromatic hydrocarbon radical of no more than 15 carbon atoms either of the lower aryl or lower aralkyl type as in the case of phenyl, tolyl, xylyl, naphthyl, fluorenyl and benzyl, phenethyl, phenylpropyl, naphthylmethyl, methylbenzyl and the like.

The radical A is a lower, bivalent, saturated, aliphatic hydrocarbon radical, containing at least 2 carbon atoms spaced between the 2 nitrogen atoms, derived from such straight-chained or branch-chained hydrocarbons as ethylene, propylene, butylene, amylene and hexylene or polymethylene radicals as trimethylene to octamethylene.

The radicals R and R' can be lower alkyl radicals such as methyl, ethyl, straight-chained and branch-chained propyl, butyl, amyl, and hexyl. The radical NRR' can also be a nitrogen-containing heteromonocyclic radical such as a morpholino, pyrrolidino, piperidino, alkylated pyrrolidino or piperidino radical.

The esters which constitute this invention are conveniently prepared by heating a chloroformate of the structural formula

with an amine of the following structural formula

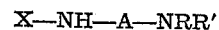

all symbols being defined as hereinabove, in an inert organic solvent such as benzene, a lower alkylbenzene or a lower alkanone.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The carbamic acid esters described and claimed in the present application are valuable as intermediates in organic synthesis. They are of value because of their medicinal action on cardiovascular, neuromuscular, and renal functions. The quaternary salts are also of value as active parasiticides.

The examples below are given to illustrate in further detail certain of the compounds which constitute the invention and convenient methods for their preparation. However, the details set forth are in no way to be construed as limiting the invention in spirit or in scope. It will be apparent to chemists skilled in the art of organic synthesis that many modifications in materials and methods can be used without departing from the invention. In these examples temperatures are given in degrees centigrade (° C.), pressures during vacuum distillations in millimeters (mm.) of mercury, and quantities of materials in parts by weight.

EXAMPLE 1

Phenyl ester of N-(β-diethylaminoethyl)cyclohexanecarbamic acid

A solution of 312 parts of phenyl chloroformate and 396 parts of N-(β-diethylaminoethyl)cyclohexylamine in 1600 parts of butanone is heated at reflux temperature for 12 hours and then treated with ethanol to destroy the unreacted chloroformate. The solution is concentrated on the steam bath and the oily residue dissolved in water, rendered alkaline by addition of sodium hydroxide, and extracted with ether. The ether extract is dried over anhydrous potassium carbonate, filtered and evaporated. The phenyl ester of N-(β-diethylaminoethyl)cyclohexanecarbamic acid is distilled at about 175–177° C. and 2 mm. pressure.

An ether solution of the distillate is treated with one equivalent of a 25% solution of hydrogen chloride in anhydrous isopropanol. Storage at 0° C. induces precipitation. Recrystallized from ethyl acetate the hydrochloride thus obtained melts at about 124–126° C. It has the structural formula

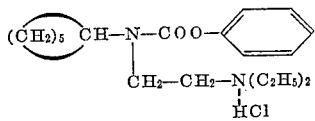

EXAMPLE 2 p-Tolylethyl ester of N-(δ-dimethylaminobutyl)-cyclopropanecarbamic acid

A mixture of 14 parts of p-tolylethyl chloroformate and 11 parts of N-(δ-dimethylaminobutyl)cyclopropylamine in 100 parts of benzene is heated at reflux temperature for 12 hours and then concentrated on the steam bath and treated with cold, dilute hydrochloric acid. The aqueous layer is separated, washed with ether, and rendered alkaline by addition of ammonium hydroxide. The base is extracted with ether and the ether extract is dried over anhydrous calcium sulfate, stirred with decolorizing charcoal, filtered and evaporated to yield the p-tolylethyl ester of N-(δ-dimethylaminobutyl)cyclopropanecarbamic acid as a high boiling, amber oil which has the structural formula

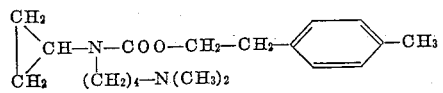

EXAMPLE 3

Phenyl ester of N-(β-diethylaminoethyl)carbanilic acid

A solution of 312 parts of phenyl chloroformate and 384 parts of N-(β-diethylaminoethyl)aniline in 1600 parts of butanone is heated at reflux temperature for 10 hours and then treated with ethanol to destroy the unreacted chloroformate. Upon concentration on the steam bath the hydrochloride of the phenyl ester of N-(β-diethylaminoethyl)carbanilic acid precipitates, which, recrystallized from isopropanol, melts at about 155–156° C. It has the structural formula

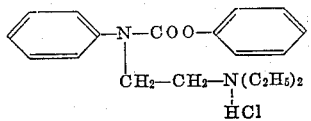

EXAMPLE 4

Benzyl ester of N-(β-diethylaminoethyl)carbanilic acid

Upon mixing of 250 parts of benzyl chloroformate and 192 parts of N-(β-diethylaminoethyl)aniline in 1600 parts of benzene, a vigorous reaction occurs which is completed by heating at reflux temperature for 1 hour. The excess chloroformate is decomposed by addition of ethanol after which the mixture is treated with dilute hydrochloric acid. The aqueous layer is separated, rendered alkaline by addition of dilute potassium hydroxide and extracted with ether. This extract is dried over anhydrous potassium carbonate, filtered and evaporated to leave as a residue the benzyl ester of N-(β-diethylaminoethyl)carbanilic acid which boils at about 181–183° C. and 1 mm. pressure. It has the structural formula

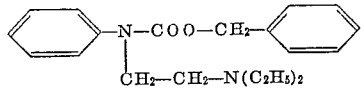

EXAMPLE 5

β-(1-naphthyl)ethyl ester of N-(β-morpholinoethyl)-2-naphthalenecarbamic acid A mixture of 1 part of β-(1-naphthyl)ethyl chloroformate and 1 part of N-(β-morpholinoethyl)-2-naphthylamine in 10 parts of xylene is heated at reflux temperature for 10 hours and then treated with ethanol to decompose the unreacted chloroformate. After concentration on the steam bath, the residue is treated with dilute hydrochloric acid and the aqueous layer is separated, washed with ether, and rendered alkaline by addition of dilute sodium hydroxide. The base is extracted with ether and the ether extract is dried over anhydrous calcium sulfate, stirred with decolorizing charcoal, filtered and evaporated to leave the β-(1-naphthyl)ethyl ester of N-(β-morpholinoethyl)-2-naphthalenecarbamic acid as a high boiling, light amber oil of the structural formula

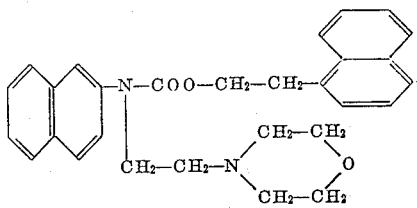

I claim:

1. An ester of the structural formula

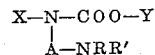

wherein X is a member of the class consisting of lower cycloalkyl radicals containing 3 to 6 carbon atoms, phenyl, and naphthyl radicals, Y is a member of the class consisting of phenyl, phenyl-(lower alkyl), (lower alkyl)-phenyl-(lower alkyl), and naphthyl-(lower alkyl) radicals, A is a lower, saturated, bivalent, aliphatic hydrocarbon radical containing 2 to 4 carbon atoms, and NRR' is a member of the class consisting of lower dialkylamino, morpholino, pyrrolidino and piperidino radicals.

2. A carbamate of the structural formula

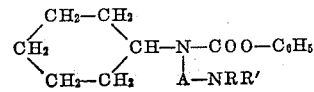

wherein A is a lower, saturated, bivalent, aliphatic hydrocarbon radical containing 2 to 4 carbon atoms, and R and R' are lower alkyl radicals.

3. A carbamate of the structural formula

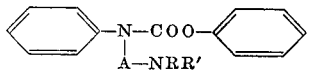

wherein A is a lower, saturated, bivalent, aliphatic hydrocarbon radical containing 2 to 4 carbon atoms, and R and R' are lower alkyl radicals.

4. A carbamate of the structural formula

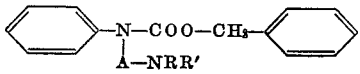

wherein A is a lower, saturated, bivalent, aliphatic hydrocarbon radical containing 2 to 4 carbon atoms, and R and R' are lower alkyl radicals 5. A compound of the formula

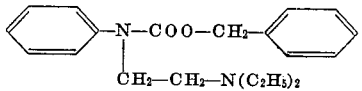

References Cited in the file of this patent

Leffler: J. Amer. Chem. Soc., vol. 70 (1948) page 3440.